(12) United States Patent
Gong et al.

(10) Patent No.: US 12,277,398 B2
(45) Date of Patent: Apr. 15, 2025

(54) MODEL TRAINING (71) Applicant: BEIJING BAIDU NETCOM SCIENCE TECHNOLOGY CO., LTD., Beijing (CN)

(72) Inventors: Jian Gong, Beijing (CN); Yu Sun, Beijing (CN); Hao Tian, Beijing (CN); Hua Wu, Beijing (CN); Haifeng Wang, Beijing (CN); Qiaoqiao She, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 489 days.

(21) Appl. No.: 17/694,034

(22) Filed: Mar. 14, 2022

(65) Prior Publication Data
US 2022/0198153 A1 Jun. 23, 2022

(30) Foreign Application Priority Data

Apr. 12, 2021 (CN) .......................... 202110386608.2

(51) Int. Cl.
G06F 40/40 (2020.01)
G06F 40/205 (2020.01)
G06F 40/284 (2020.01)

(52) U.S. Cl.
CPC ............ *G06F 40/40* (2020.01); *G06F 40/205* (2020.01); *G06F 40/284* (2020.01)

(58) Field of Classification Search
CPC ........ G06F 18/214; G06F 40/30; G06F 40/20; G06F 16/3344; G06F 40/205;
(Continued)

(56) References Cited

U.S. PATENT DOCUMENTS 11,599,783 B1 * 3/2023 Hong .................... G06F 9/5027
11,853,704 B2 * 12/2023 Zhang ............... G06F 18/24133
(Continued)

FOREIGN PATENT DOCUMENTS

CN 108229686 A 6/2018
CN 108563204 A 9/2018
(Continued)

OTHER PUBLICATIONS

"A Comprehensive Analysis of BML Automatic Hyperparameter Search Technology of Baidu's Full-Featured AI Development Platform," (available at: https://baijiahao.baidu.com/s?id=1688121061432949280&wfr=spider&for-pc) (Jan. 6, 2021).
(Continued)

*Primary Examiner* — Abdelali Serrou
(74) *Attorney, Agent, or Firm* — Leydig, Voit & Mayer, Ltd.

(57) ABSTRACT

A model training method, a model training platform, an electronic device and a storage medium are provided, which can be used in the field of artificial intelligence, particularly the fields of natural language processing and deep learning. The model training method includes: receiving an input; determining, based on the input, a user-oriented prefabricated function; determining, based on the input, a model training function; determining, based on the input, a pre-trained model; determining, based on the input, a network structure associated with the pre-trained model so as to support use of the pre-trained model; training, based on the input, the model by using the prefabricated function, the model training function, and the pre-trained model; and providing an output associated with a trained model.

20 Claims, 6 Drawing Sheets (58) Field of Classification Search
CPC ........ G06F 40/284; G06F 40/216; G06F 8/35; G06F 16/35; G06F 16/2282; G06F 40/40; G06F 16/3329; G06F 18/2178; G06F 18/213; G06F 18/2431; G06F 40/295; G06F 18/285; G06F 18/251; G06F 40/268; G06F 16/90332; G06F 16/958; G06F 3/167; G06F 16/9032; G06F 3/16; G06F 18/22; G06F 16/316; G06F 16/3334; G06F 16/334; G06F 16/353; G06F 16/355; G06F 16/374; G06F 18/23213; G06F 18/24; G06F 18/2413; G06F 18/2415; G06F 40/247; G06F 40/279; G06F 40/289; G06F 40/35
See application file for complete search history.

(56) References Cited

U.S. PATENT DOCUMENTS

| | | | | |
|---|---|---|---|---|
| 2019/0370616 | A1* | 12/2019 | Eser | G06F 18/256 |
| 2020/0202170 | A1* | 6/2020 | Basu | G06F 18/217 |
| 2020/0401930 | A1 | 12/2020 | Smirnov et al. | |
| 2021/0019665 | A1* | 1/2021 | Gur | G06F 8/36 |
| 2021/0264902 | A1* | 8/2021 | Larson | G06F 40/35 |
| 2023/0119613 | A1* | 4/2023 | Lin | G06F 40/186 |
| | | | | 704/9 |

FOREIGN PATENT DOCUMENTS

| | | | |
|---|---|---|---|
| CN | 109409528 | A | 3/2019 |
| CN | 109582982 | * | 4/2019 |
| CN | 109656529 | A | 4/2019 |
| CN | 110008319 | A | 7/2019 |
| CN | 110059237 | A | 7/2019 |
| CN | 111259988 | A | 6/2020 |
| CN | 111399958 | A | 7/2020 |
| CN | 111860870 | A | 10/2020 |
| CN | 112416333 | A | 2/2021 |
| JP | 2012194691 | A | 10/2012 |
| JP | 2017130196 | A | 7/2017 |
| JP | 2019185127 | A | 10/2019 |

OTHER PUBLICATIONS

Xu et al., "A Survey of Research on Word Vectors and Pretrained Language Models," Journal of Shanghai University of Electric Power, vol. 36, No. 4, pp. 320-328 (Aug. 15, 2020).

Su Haibo, Liu Yijing. "Improved Training Algorithm Based on Pre-Trained Model and Joint Parameter Tuning," Informatization-Research, pp. 44-49 (Feb. 20, 2020).

"Text Classification Helps Consulting Firms Become Efficient and Intelligent Headhunters," (available at: https://baike.baidu.com/reference/18094191/de87BCabY8Q7FBZVmW35n8Kbmx3OkD4W1Qj7eB0PguJPTJ4vKY23GL7N4UHD7zhTh0ZAua-KAAXU3t_Q8LMF) (Feb. 22, 2021).

* cited by examiner

MODEL TRAINING

CROSS-REFERENCE TO RELATED APPLICATIONS

This application claims priority to Chinese Patent Application No. 202110386608.2, filed on Apr. 12, 2021, the contents of which are hereby incorporated by reference in their entirety for all purposes.

TECHNICAL FIELD

The present disclosure relates to computer technology, and more specifically, to a model training method, a model training platform, an electronic device and a storage medium, which can be used in the field of artificial intelligence, especially in the field of natural language processing and deep learning.

BACKGROUND

In recent years, natural language processing technology represented by pre-training in the field of artificial intelligence has experienced explosive growth, and new technologies and new models emerge in endlessly. Under the background of the new era, how to efficiently apply diversified advanced scientific research achievements in the field of natural language processing to industry practice and solve the practical problem is a core problem in the field of natural language processing. Besides, deep learning is a key technology in the field of artificial intelligence, and research and development personnel usually carry out related work based on a deep learning framework.

However, a traditional method and platform used for model training cannot meet complex deep learning development requirements, thereby failing to meet the demand of the user for an efficient model training method and model training platform.

SUMMARY

According to embodiments of the present disclosure, a model training method, a model training platform, an electronic device and a storage medium are provided.

In a first aspect of the present disclosure, a model training method is provided and includes: receiving an input through an interaction performed using at least one interaction mode, wherein the at least one interaction mode is associated with an interactive interface; determining, based on the input, a user-oriented prefabricated function, wherein the user-oriented prefabricated function is associated with a model to be trained; determining, based on the input, a model training function associated with a training process of the model; determining, based on the input, a pre-trained model that is pre-trained based on deep learning; determining, based on the input, a network structure associated with the pre-trained model; training, based on the input, the model using the user-oriented prefabricated function, the model training function, and the pre-trained model; and providing, through the interaction performed using the at least one interaction mode, an output associated with the trained model.

In a second aspect of the present disclosure, a model training platform is provided and includes: a data interaction module, configured to provide at least one interaction mode so as to support receiving an input from the outside of the model training platform and providing an output to the outside of the model training platform, wherein the interaction mode is associated with an interactive interface; an interaction supporting module, configured to provide support for an interaction between the data interaction module and other modules in the model training platform, wherein the interaction is associated with model training; a function providing module, configured to provide a user-oriented prefabricated function, wherein the prefabricated function is associated with a model trained by the model training platform; a model training supporting module, configured to provide a model training function needed for supporting performing of the model training using the model training platform, wherein the model training function is associated with a training process of the model; a pre-trained model module, configured to provide a pre-trained model pre-trained based on deep learning; and a pre-trained model supporting module, configured to provide a network structure associated with the pre-trained model so as to support use of the pre-trained model.

In a third aspect of the present disclosure, an electronic device is provided and includes at least one processor, and a memory in communication connection with the at least one processor, wherein the memory stores instructions executable by the at least one processor, and the instructions are executed by the at least one processor to cause the at least one processor to realize the method according to the first aspect of the present disclosure.

In a fourth aspect of the present disclosure, a non-transitory computer readable storage medium storing computer instructions is provided, and the computer instructions are configured to make a computer realize the method according to the first aspect of the present disclosure.

It should be understood that contents described in the summary part are neither intended to limit key or important features of the embodiments of the present disclosure, nor used to limit the scope of the present disclosure. Other features of the present disclosure will be easy to understand through the following description.

BRIEF DESCRIPTION OF THE DRAWINGS

Exemplary embodiments of the present disclosure are further detailed in combination with accompanying drawings, the above and other objectives, features and advantages of the present disclosure will be clearer, and the same reference number usually represents the same component in the exemplary embodiments of the present disclosure. It should be understood that the drawings are used for better understanding the solutions and do not constitute limitation to the present disclosure.

DETAILED DESCRIPTION

Hereinafter, preferred embodiments of the present disclosure will be described in more details with reference to the drawings. It should be understood that the present disclosure may be realized in various manners instead of being limited by the embodiments described herein though the preferred embodiments of the present disclosure are shown in the drawings. Rather, these embodiments are provided so that the present disclosure is more thorough and complete and the scope of the present disclosure can be completely conveyed to those skilled in the art.

A term "include" and its transformations used herein represent open inclusion, namely, "include but not limited to". Unless specially stated, a term "or" represents "and/or", a term "based on" represents "at least partially based on", a term "an exemplary embodiment" and "an embodiment" represent "at least one exemplary embodiment", a term "another embodiment" represents "at least another one embodiment", terms "first", "second" and the like may represent different or same objects. Herein, other clear or hidden definitions may be included.

As described in the background, a traditional method and platform used for model training cannot meet complex deep learning development requirements, thereby failing to meet the demand of the user for the efficient model training method and the model training platform.

For example, in the traditional technology, the model training platform usually has two implementations. The first implementation uses an industrial-grade natural language processing toolkit focusing on basic tasks, performs certain code encapsulation based on the international open source deep learning development framework such as TensorFlor and Pytorch, prefabricates development instance codes of basic tasks such as text classification, text matching and sequence annotation and meanwhile prefabricates an international open source pre-trained model so as to realize a basic natural language processing training task. The second implementation is based on a data analysis platform of a traditional machine learning technology, mainly provides a built-in traditional algorithm model including non-deep-learning algorithms of classification, regression, clustering, etc. which are not based on a pre-trained model, recombines a combined model, performs analysis through iteration, and performs displaying of parameter configuration results through a singular interface module, etc. However, there are distinct defects in the implementations in the traditional technology.

As for the first implementation, in terms of an application level, there are very few prefabricated tasks, thereby failing to meet complex diversified natural language processing training demands in an industrial scenario; it adopts the international open source deep learning framework and the pre-trained model but does not have a core control right over these technologies and has a risk of being technically limited; it only provides the universal pre-trained model and therefore needs further pre-training for a specific scenario task, which leads to excessively high cost, and the effect is not ideal if only fine tuning is made; it is customized only for data processing work of the specific task in general and is not flexible and convenient for the more flexible and complex data preprocessing scenario; its distillation tool is singular and even no distillation mode is provided, which consequently affects model deployment; and it generally does not provide the acceleration solution for deployment scenarios, thereby hardly meeting the complex industrial scenario demands. In terms of the system level, it is not flexible in networking code encapsulation, the network structure cannot be modified flexibly, and the multi-label multi-task learning cannot be supported, and it is generally incompatible with the web interactive development platform and is not sufficient in supporting of users at different technical levels.

As for the second implementation, the complexity of the deep learning algorithm is far higher than that of the traditional machine learning algorithm, and thus the involved algorithm and functional integration function have a higher requirement for development personnel. Consequently, the original machine learning framework cannot meet complex deep learning development requirements, and preserve hot start function for the common models of the deep learning, which is not supported by the traditional machine learning platform.

In order to at least partially solve the above problem and one or more problems in other potential problems, the embodiment of the present disclosure provides a model training platform. The model training platform can cover an overall natural language processing customized development scenario, more efficient model training capacity can be provided through customized pre-training technology, the simple and easy interaction mode can be provided, the expandability of the platform can be improved through independence between modules, and therefore, user experience can be improved by providing capacity of efficient model training, especially model training of deep learning.

Figure 1:
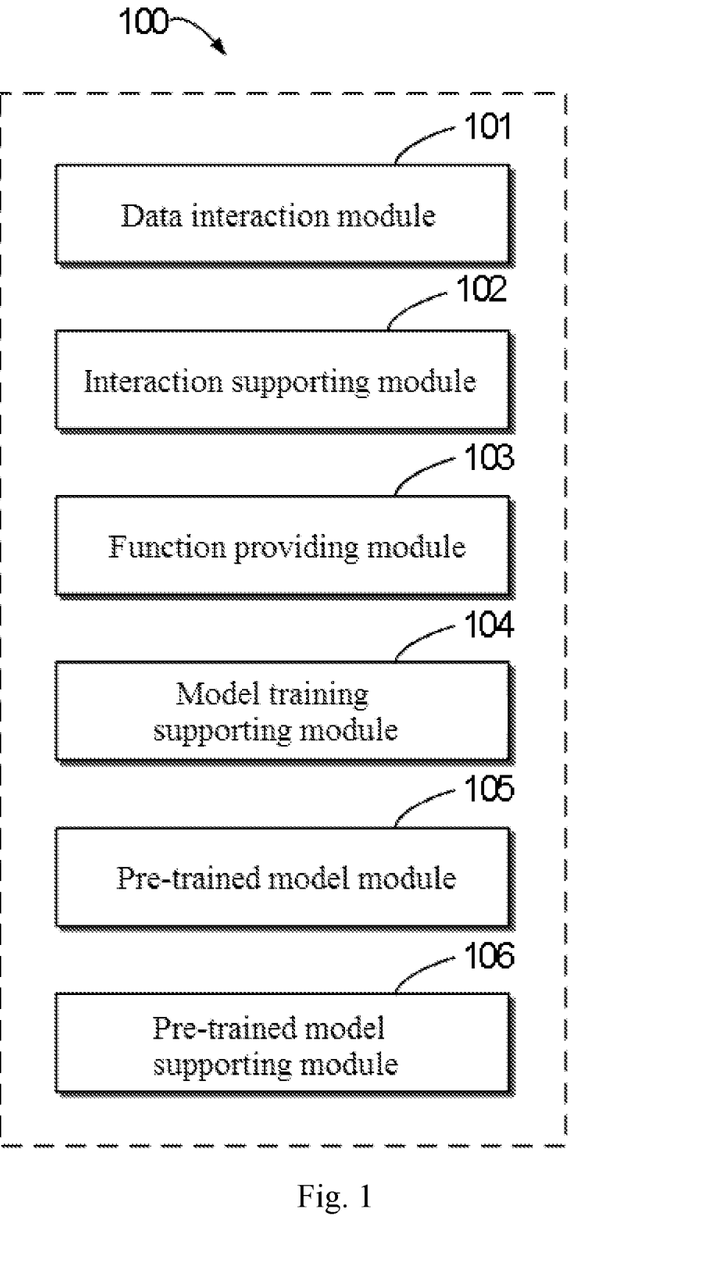
FIG. 1 shows a schematic block diagram of a model training platform 100 according to an embodiment of the present disclosure.

FIG. 1 shows a schematic block diagram of a model training platform 100 according to an embodiment of the present disclosure. As shown in FIG. 1, the model training platform 100 includes a data interaction module 101, an interaction supporting module 102, a function providing module 103, a model training supporting module 104, a pre-trained model module 105 and a pre-trained model supporting module 106.

The data interaction module 101 is configured to provide at least one interaction mode so as to support receiving an input from the outside of the model training platform 100 and providing an output to the outside of the model training platform 100, wherein the interaction mode is associated with an interactive interface. According to one or more embodiments of the present disclosure, different interactive interfaces may be provided for different users so as to expose different interfaces. For example, on an Easydl zero-threshold platform, a user only needs to configure a data input/output address, while on a BML full-function platform, the user may further configure task parameters, a workflow, even a neural network architecture, etc.

The interaction supporting module 102 is configured to provide support for the interaction between the data interaction module and other modules in the model training platform 100, wherein the interaction is associated with model training. According to one or more embodiments of the present disclosure, the interaction supporting module 102 may be configured to provide support for one or more interactions as follows: an interaction mode associated with a network selection, an interaction mode associated with network assembly, an interaction mode associated with network storage, an interaction mode associated with training package assembly, an interaction mode associated with training task initiation, an interaction mode associated with authentication, and an interaction mode associated with statistics. Besides, as the interaction supporting module 102 is decoupled from the data interaction module 101, the same interaction supporting module 102 may be used for data interaction modules 101 positioned by different products, which can be realized only by technically exposing the different interfaces, and thus good convenience can be provided.

The function providing module 103 is configured to provide a user-oriented prefabricated function, wherein the prefabricated function is associated with a model trained by the model training platform. According to one or more embodiments of the present disclosure, the function providing module 103 is configured to provide specific functions prefabricated for the user and needed by various industrial fields. These functions may, for example, include one or more functions as follows: a text multi-label classification function, a text hierarchical classification function, a small sample text classification function, a noise text classification function, an entity recognition function, an entity relation extraction function, an entity attribute extraction function, a term importance analysis function, a sentiment analysis function, a text check function, a search-recall function, a search-sorting function, a text abstract generation function, a text error correction function, a data distillation function, a model distillation function, a multi-label learning function, a multi-task learning function, a self-supervision pre-training learning function, a feature importance analysis function, a medical entity recognition function, a medical question and answer matching function, an articles-of-law recommendation function and a name-of-crime prediction function.

The model training supporting module 104 is configured to provide a model training function needed for supporting performing of the model training using the model training platform 100, wherein the model training function is associated with a training process of the model. According to one or more embodiments of the present disclosure, the model training supporting module 104 is configured to provide one or more functions as follows: an actuator initializing function, an operational program initializing function, a single-machine-multi-card environment configuration function, a multi-machine-multi-card environment configuration function, a multi-machine-central-processing-unit environment configuration function, a model loading function and a model saving function. The user can apply the above functions directly through related configurations without writing underlying code.

The pre-trained model module 105 is configured to provide a pre-trained model pre-trained based on deep learning. According to one or more embodiments of the present disclosure, the pre-trained model is a model pre-trained in advance based on deep learning. These models and networks thereof can be assembled into a neural network of other tasks, and then fine adjustment training may be further performed based on hot start of a trained model, so remarkably excellent effect can be achieved compared with not using the pre-trained model. For example, the pre-trained model module 105 may be configured to provide one or more pre-trained models as follows: a universal pre-trained model, a pre-trained model associated with healthcare, a pre-trained model associated with laws and regulations, a pre-trained model associated with affective computing, a pre-trained model associated with text check and a pre-trained model associated with the financial field.

The pre-trained model supporting module 106 is configured to provide a network structure associated with the pre-trained model so as to support use of the pre-trained model. According to one or more embodiments of the present disclosure, as network structures of different pre-trained models are different, the pre-trained model supporting module 106 may be configured to be used for integrating network structures shared by the different pre-trained models, the different network structures may be switched flexibly by modifying configurations, and thus the function for one-key replacement of the pre-trained models can be realized for the user.

Figure 2:
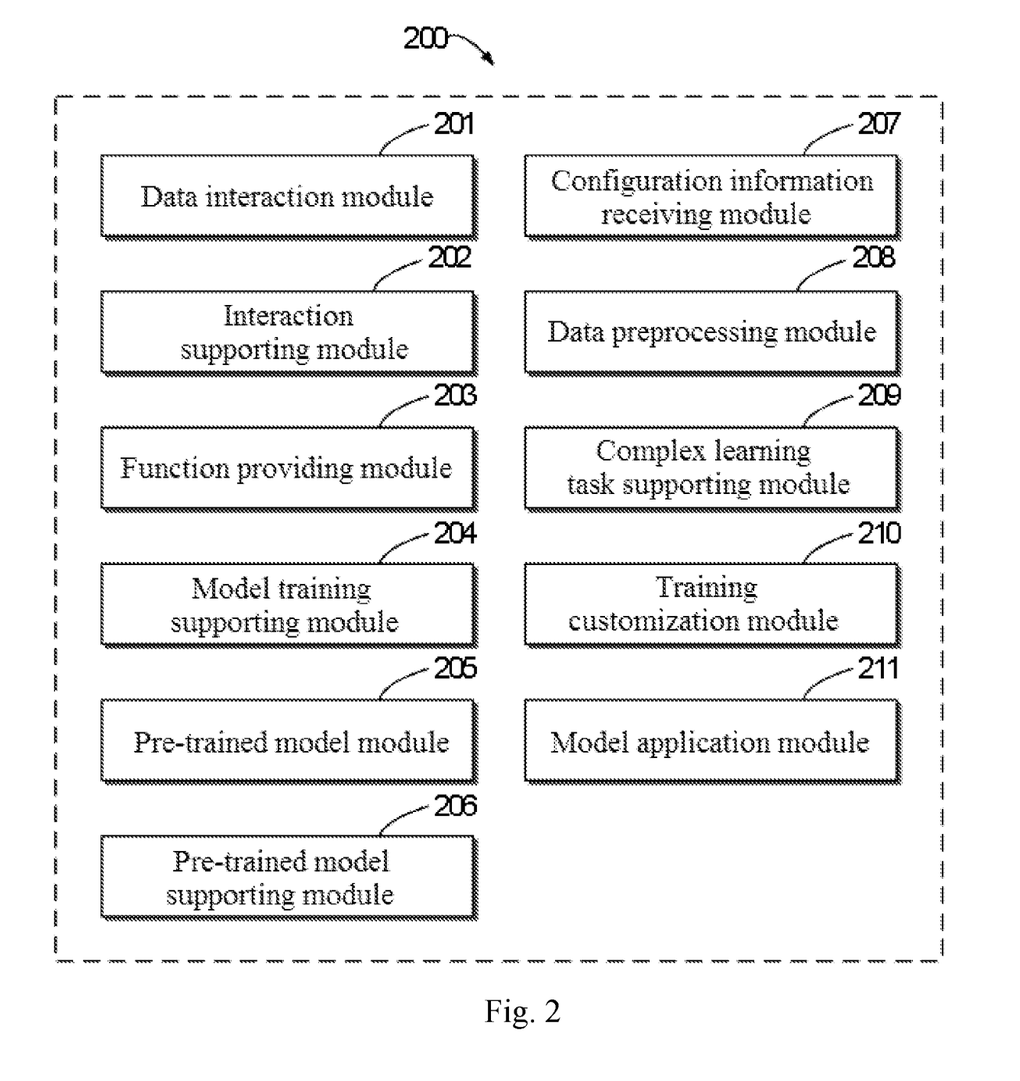
FIG. 2 shows a schematic block diagram of a model training platform 200 according to an embodiment of the present disclosure.

FIG. 2 shows a schematic block diagram of a model training platform 200 according to an embodiment of the present disclosure. As shown in FIG. 2, the model training platform 200 includes a data interaction module 201, a interaction supporting module 202, a function providing module 203, a model training supporting module 204, a pre-trained model module 205, a pre-trained model supporting module 206, a configuration information receiving module 207, a data preprocessing module 208, a complex learning task supporting module 209, a training customization module 210 and a model application module 211.

Functions of the data interaction module 201, the interaction supporting module 202, the function providing module 203, the model training supporting module 204, the pre-trained model module 205 and the pre-trained model supporting module 206 are basically the same as those of the data interaction module 101, the interaction supporting module 102, the function providing module 103, the model training supporting module 104, the pre-trained model module 105 and the pre-trained model supporting module 106, which are not repeated in detail herein.

The configuration information receiving module 207 is configured to receive configuration information, wherein the configuration information is associated with requesting applying functions provided by the modules in the model training platform 200. According to one or more embodiments of the present disclosure, the configuration information receiving module 207 includes one or more items as follows: a configuration information importing module (not shown), configured to import the configuration information; a registrator module (not shown), configured to register the configuration information; a json parsing module (not shown), configured to perform json parsing based on the configuration information; and a class name matching module (not shown), configured to perform class name matching based on the configuration information. By means of the above modules, the user can apply desired functions only by filling the configuration information according to a regulated configuration file format.

The data preprocessing module 208 is configured to perform preprocessing on a received input of the model training platform 200. According to one or more embodiments of the present disclosure, the data preprocessing module 208 includes one or more items as follows: a data set reading module, configured to read a data set from the input for preprocessing; a domain reading module, configured to read a domain from the input for preprocessing; a tokenizer module, configured to perform tokenization on the input for preprocessing; and a vocabulary module, configured to obtain a vocabulary from the input for preprocessing. By abstracting out a concept of a feature domain, when there are different domains in a same sample, the different domains have independent data types (a text, a numerical value, an integral type and a floating-point type), and an open source has an independent vocabulary, etc. Semantic representation can be performed according to the different domains, such as a text-to-id operation, etc., so a data structure needed by various complex tasks can be flexibly expanded, and a non-text numerical type feature input can be supported.

The complex learning task supporting module 209 is configured to provide support for design and development of a network structure of a complex learning task. According to one or more embodiments of the present disclosure, the complex learning task supporting module 209 includes one or more items as follows: a forward propagation network module, configured to provide a forward propagation network used for the complex learning task; an optimization strategy module, configured to provide an optimization strategy used for design and development of the network structure; and an evaluation index module, configured to provide an evaluation index used for design and development of the network structure. By means of the above modules, design and development of network structures of complex tasks such as multi-label learning and multi-task learning can be realized.

The training customization module 210 is configured to adjust, based on the input, an operation associated with the model training. According to one or more embodiments of the present disclosure, the training customization module 210 includes one or more items as follows: a training process customization module, configured to adjust, based on the input, the training process associated with the model training; an evaluation process customization module, configured to adjust, based on the input, an evaluation process associated with the model training; and a visual evaluation module, configured to adjust, based on the input, visual evaluation associated with the model training. By means of the above module, the user of the model training platform 200 can flexibly modify the training process and the evaluation process, thereby completing design and development of more complex training tasks.

The model application module 211 is configured to provide a function associated with applying the trained model. According to one or more embodiments of the present disclosure, the model application module 211 is configured to provide one or more functions as follows: a special processing unit deployment function, a central processing unit deployment function, a single prediction function, a batch prediction function, a C++ application programming interface function, and a Python application programming interface function. By means of the above functions, industrial application specific to the functions associated with the trained model can be completed.

Figure 3:
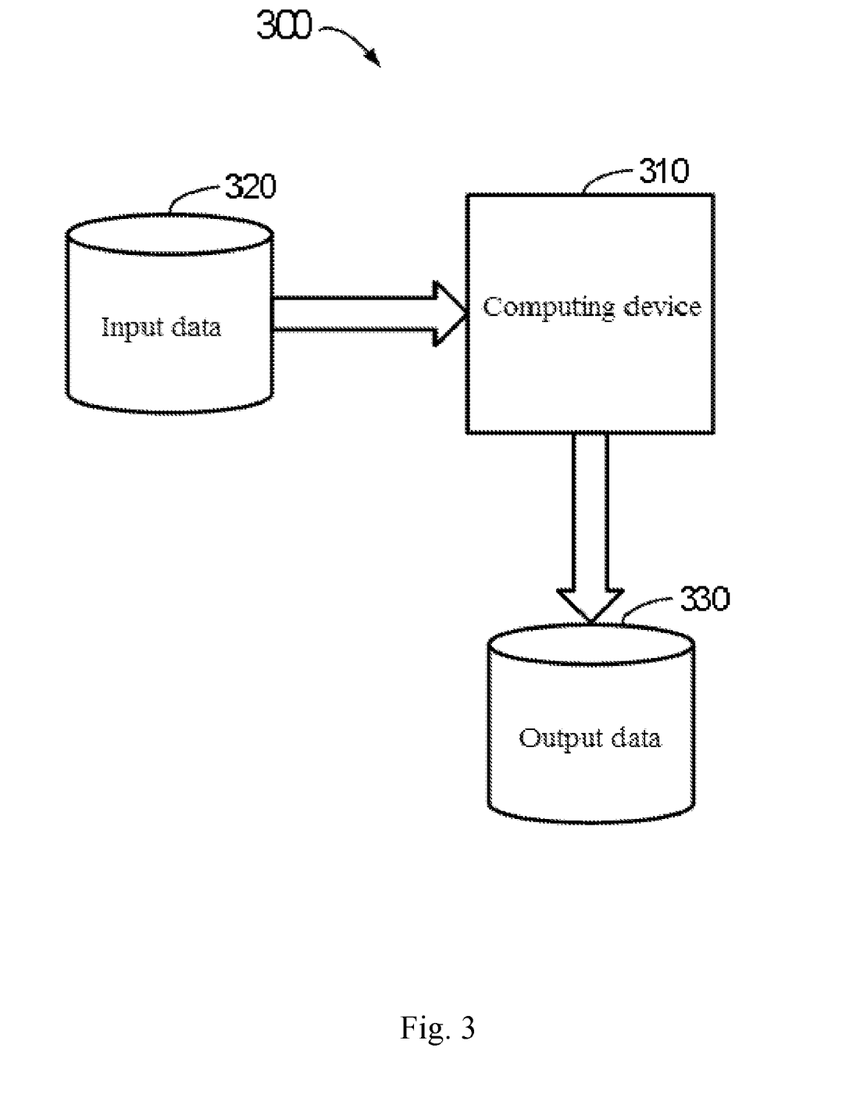
FIG. 3 shows a schematic block diagram of a model training environment 300 in which a model training method in some embodiments of the present disclosure can be realized.

FIG. 3 shows a schematic block diagram of a model training environment 300 in which a model training method in some embodiments of the present disclosure can be realized. According to one or more embodiments of the present disclosure, the model training environment 300 may be a cloud environment. As shown in FIG. 3, the model training environment 300 includes a computing device 310. In the model training environment 300, input data 320 serve as an input of the computing device 310 to be provided to the computing device 310. The input data 320 may, for example, include input data which can serve as the input of the model training platform 100 and the model training platform 200 as described above with reference to the model training platform 100 and the model training platform 200. For example, the input data 320 may include the data input/output address associated with the model training, the task parameters, the workflow, the neural network architecture, the selection of the interaction mode, the selection of the user-oriented prefabricated function, the selection of the model training function, the selection of the pre-trained model, the selection of the network structure associated with the pre-trained model, the configuration information and operation expected to be performed on the configuration information, the selection of preprocessing, the input associated with design and development of the network structure of the complex learning task, the input used for adjusting the operation associated with the model training, the selection of the function associated with applying the trained model, etc. According to one or more embodiments of the present disclosure, the computing device 310 can receive the input data 320 through the interaction performed by using the at least one interaction mode.

The computing device 310 can execute, based on the input data 320, the model training operation after receiving the input data 320, and provides the output associated with the trained model to serve as the output data 330. According to one or more embodiments of the present disclosure, the computing device 310 can provide the output associated with the trained model through the interaction performed by using the at least one interaction mode to serve as the output data 330, and the output data 330 may, for example, include parameters associated with the trained model, the evaluation result, even the trained model per se., etc.

It should be understood that the model training environment 300 is only exemplary but not limiting, is expandable and may include more computing devices 310, more input data 320 can be provided to the computing devices 310, and more output data 330 can be provided from the computing devices 310, so that the demand of more users for simultaneously using the more computing devices 310 and even using more input data 320 to perform the model training operation simultaneously or non-simultaneously so as to obtain more output data 330 can be met.

In the model training environment 300 shown in FIG. 3, inputting the input data 320 to the computing device 310 and outputting the output data 330 from the computing device 310 can be performed through the network.

Figure 4:
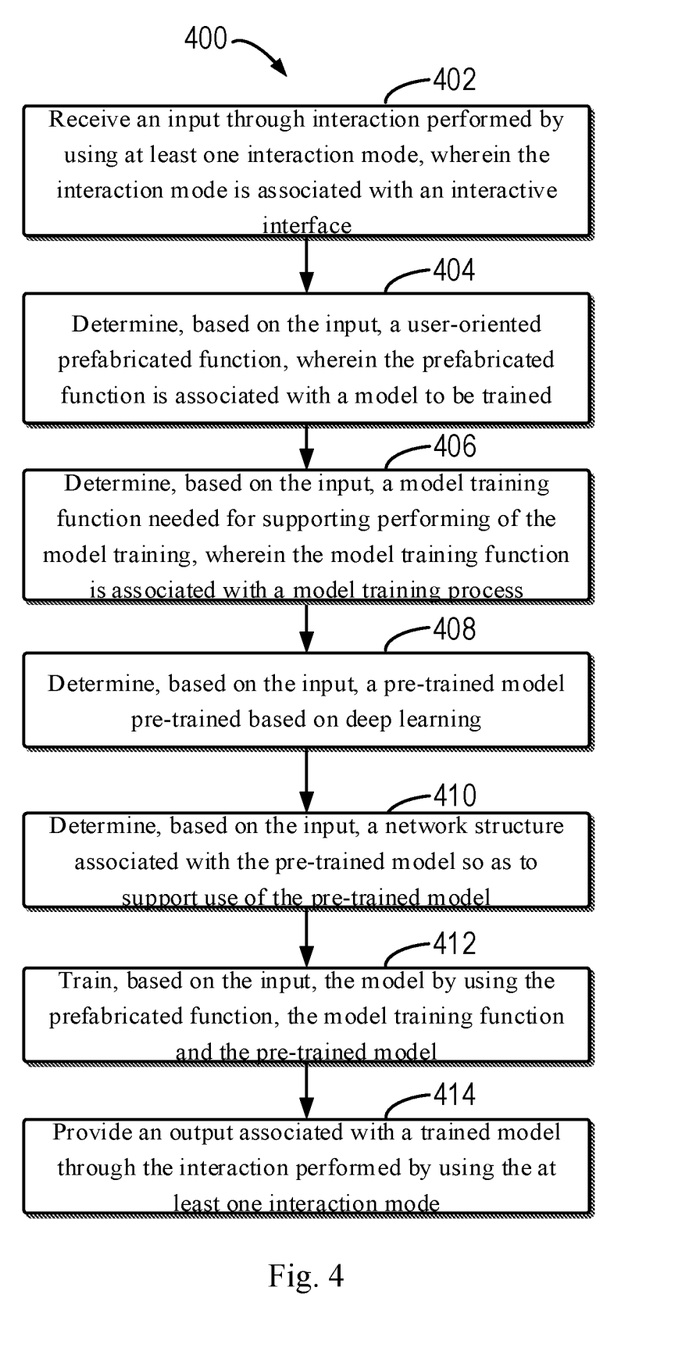
FIG. 4 shows a flowchart of a model training method 400 according to an embodiment of the present disclosure.

FIG. 4 shows a flowchart of a model training method 400 according to an embodiment of the present disclosure. Specifically, the model training method 400 may be realized by using the model training platform 100 shown in FIG. 1 and can be executed by the computing device 310 in the model training environment 300 shown in FIG. 3. It should be understood that the model training method 400 may further include additional operations not shown and/or may omit the shown operations, and the scope of the present disclosure is not limited in this aspect.

In the block 402, the computing device 310 receive the input through the interaction performed by using the at least one interaction mode, wherein the interaction mode is associated with the interactive interface. According to one or more embodiments of the present disclosure, the different interactive interfaces can be provided for the different users so as to expose the different interfaces. For example, on the Easydl zero-threshold platform, the user only needs to configure the data input/output address, while on the BML full-function platform, the user may further configure the task parameters, the workflow, even the neural network architecture, etc.

According to one or more embodiments of the present disclosure, the interaction performed by using the at least one interaction mode includes one or more interactions as follows: the interaction associated with network selection, the interaction associated with network assembly, the interaction associated with network storage, the interaction associated with training package assembly, the interaction associated with training task start, the interaction associated with authentication, and the interaction associated with statistics.

In the block 404, the computing device 310 determines, based on the input, the user-oriented prefabricated function, wherein the prefabricated function is associated with the model to be trained. According to one or more embodiments of the present disclosure, determining the user-oriented prefabricated function includes determining one or more functions as follows: the text multi-label classification function, the text hierarchical classification function, the small sample text classification function, the noise text classification function, the entity recognition function, the entity relation extraction function, the entity attribute extraction function, the term importance analysis function, the sentiment analysis function, the text check function, the search-recall function, the search-sorting function, the text abstract generation function, the text error correction function, the data distillation function, the model distillation function, the multi-label learning function, the multi-task learning function, the self-supervision pre-training learning function, the feature importance analysis function, the medical entity recognition function, the medical question and answer matching function, the articles-of-law recommendation function and the name-of-crime prediction function. The above various functions are specific functions prefabricated for the user and needed by various industrial fields.

In the block 406, the computing device 310 determines, based on the input, the model training function needed for supporting performing of the model training, wherein the model training function is associated with the training process of the model. According to one or more embodiments of the present disclosure, determining the model training function needed for supporting performing of the model training includes determining one or more functions as follows: the actuator initializing function, the operational program initializing function, the single-machine-multi-card environment configuration function, the multi-machine-multi-card environment configuration function, the multi-machine central processing unit environment configuration function, the model loading function and the model saving function. The user can apply the above functions directly through the related configurations without writing the underlying code.

In a block 408, the computing device 310 determines, based on the input, the pre-trained model pre-trained based on deep learning. According to one or more embodiments of the present disclosure, the pre-trained model is a model pre-trained in advance based on deep learning. These models and networks thereof can be assembled into a neural network of other tasks, and then fine adjustment training may be further performed based on hotstart of the trained model, so a remarkably excellent effect can be achieved compared with not using the pre-trained model.

In the block 410, the computing device 310 determines, based on the input, the network structure associated with the pre-trained model so as to support use of the pre-trained model. According to one or more embodiments of the present disclosure, as the network structures of the different pre-trained models are different, the network structures shared by the different pre-trained models can be integrated, the different network structures may be switched flexibly by modifying the configurations, and thus the function for one-key replacement of the pre-trained models can be realized for the user.

In the block 412, the computing device 310 trains, based on the input, the model by using the prefabricated function, the model training function and the pre-trained model. According to one or more embodiments of the present disclosure, the computing device 310, after determining the to-be-used prefabricated function, model training function and pre-trained model, trains the model based on these contents and any other possible input content so as to obtain the trained model.

In the block 414, the computing device 310 provides the output associated with the trained model through the interaction performed by using the at least one interaction mode. According to one or more embodiments of the present disclosure, the output associated with the trained model may, for example, include the parameters associated with the trained model, the evaluation result, even the trained model per se, etc.

Figure 5:
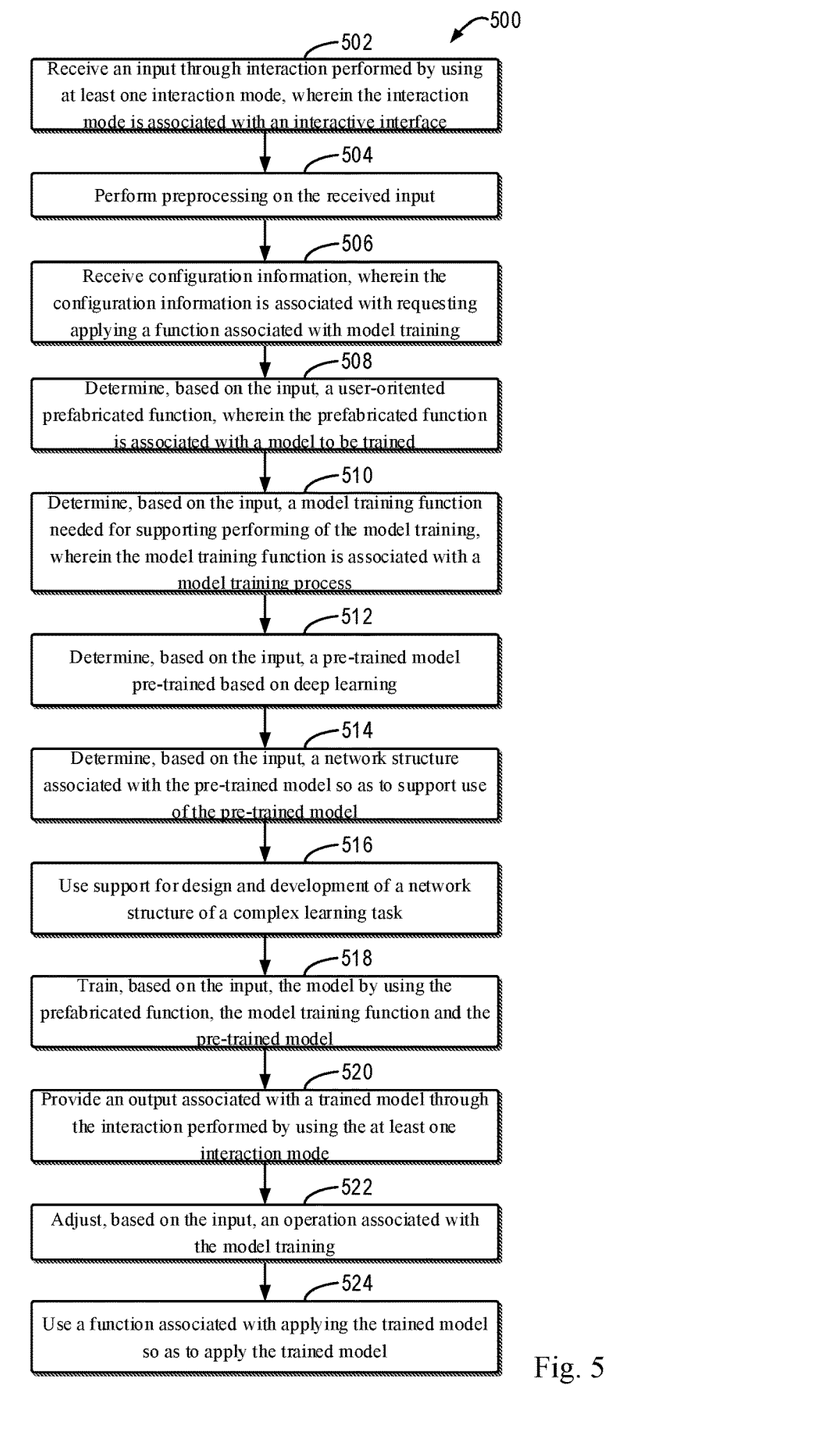
FIG. 5 shows a flowchart of a model training method 500 according to an embodiment of the present disclosure.

FIG. 5 shows a flowchart of a model training method 500 according to an embodiment of the present disclosure. Specifically, the model training method 500 may be realized by using the model training platform 200 shown in FIG. 2 and can be executed by the computing device 310 in the model training environment 300 shown in FIG. 3. It should be understood that the model training method 500 may further include additional operations not shown and/or may omit the shown operations, and the scope of the present disclosure is not limited in this aspect.

In the block 502, the computing device 310 receives the input through the interaction performed by using the at least one interaction mode, wherein the interaction mode is associated with the interactive interface. Specific contents of an involved step in the block 502 are the same as those of the involved step in the block 402 and will not be repeated in detail herein.

In the block 504, the computing device 310 performs preprocessing on the received input. According to one or more embodiments of the present disclosure, performing preprocessing on the received input includes one or more items as follows: reading the data set from the input for preprocessing; reading the domain from the input for preprocessing; performing tokenization on the input for preprocessing; and obtaining the vocabulary from the input for preprocessing. By abstracting out the concept of the feature domain, when there are different domains in the same sample, the different domains have individual data types (the text, the numerical value, the integral type and the floating-point type), and the open source has the individual vocabulary, etc. Semantic representation can be performed according to the different domains, such as the text-to-id operation, etc., so the data structure needed by the various complex tasks can be flexibly expanded, and the non-text numerical type feature input can be supported.

In the block 506, the computing device 310 receives configuration information, wherein the configuration information is associated with requesting applying a function associated with model training. According to one or more embodiments of the present disclosure, the receiving configuration information includes one or more items as follows: importing the configuration information; registering the configuration information; performing, based on the configuration information, json parsing; and performing, based on the configuration information, class name matching. By means of the configuration information, the user can apply desired functions only by filling the configuration information according to the regulated configuration file format.

In a block 508, the computing device 310 determines, based on the input, the user-oriented prefabricated function, wherein the prefabricated function is associated with the model to be trained. Specific contents of the involved step in the block 508 are the same as those of the involved step in the block 404 and will not be repeated in detail herein.

In the block 510, the computing device 310 determines, based on the input, the model training function needed for supporting performing of the model training, wherein the model training function is associated with the training process of the model. Specific contents of the involved step in the block 510 are the same as those of the involved step in the block 406 and will not be repeated in detail herein.

In the block 512, the computing device 310 determines, based on the input, the pre-trained model pre-trained based on deep learning. Specific contents of the involved step in the block 512 are the same as those of the involved step in the block 408 and will not be repeated in detail herein.

In the block 514, the computing device 310 determines, based on the input, the network structure associated with the pre-trained model so as to support use of the pre-trained model. Specific contents of the involved step in the block 514 are the same as those of the involved step in the block 410 and will not be repeated in detail herein.

In the block 516, the computing device 310 uses the support for design and development of the network structure of the complex learning task. According to one or more embodiments of the present disclosure, using the support for design and development of the network structure of the complex learning task includes one or more items as follows: using the forward propagation network used for the complex learning task, using the optimization strategy used for design and development of the network structure, and using the evaluation index used for design and development of the network structure. Using the support for design and development of the network structure of the complex learning task can realize design and development of the network structure of the complex tasks such as multi-label learning and multi-task learning.

In the block 518, the computing device 310 trains, based on the input, the model by using the prefabricated function, the model training function, and the pre-trained model. Specific contents of the involved step in the block 518 are the same as those of the involved step in the block 412 and will not be repeated in detail herein.

In the block 520, the computing device 310 provides the output associated with the trained model through the interaction performed by using the at least one interaction mode. Specific contents of the involved step in the block 520 are the same as those of the involved step in the block 414 and will not be repeated in detail herein.

In the block 522, the computing device 310 adjusts, based on the input, the operation associated with the model training. According to one or more embodiments of the present disclosure, adjusting, based on the input, the operation associated with the model training includes one or more items as follows: adjusting, based on the input, the training process associated with the model training; adjusting, based on the input, the evaluation process associated with the model training; and adjusting, based on the input, visual evaluation associated with the model training. The user can flexibly modify the training process and the evaluation process by adjusting the operation associated with the model training, thereby completing design and development of more complex training tasks.

In the block 524, the computing device 310 uses the function associated with applying the trained model so as to apply the trained model. According to one or more embodiments of the present disclosure, using the function associated with applying the trained model includes using one or more functions as follows: the special processing unit deployment function, the central processing unit deployment function, the single prediction function, the batch prediction function, the C++ application programming interface function, and the Python application programming interface function. The trained mode is applied by using the function associated with applying the trained model, industrial application specific to the functions associated with the trained model can be completed.

Related contents of the model training platform 100 according to the embodiment of the present disclosure, the model training platform 200 according to the embodiment of the present disclosure, the model training environment 300 in which the model training method in certain embodiments of the present disclosure can be realized, the model training method 400 according to the embodiment of the present disclosure and the model training method 500 according to the embodiment of the present disclosure are described above with reference to FIG. 1 to FIG. 5. It should be understood that the above description intends to better display the contents written in the present disclosure but is not to make a limit in any way.

It should be understood that the quantity of each element and its size in physical quantity adopted in all the drawings of the present disclosure are only exemplary rather than limit the protection scope of the present disclosure. The above quantity and size can be set at will as required without affecting normal implementation of implementations of the present disclosure.

Through the above description with reference to FIG. 1 to FIG. 5, technical solutions according to the implementations of the present disclosure have many advantages compared with traditional solutions. For example, by means of the technical solutions of the implementations of the present disclosure, manpower and material resources for data annotations and underlying code development can be greatly reduced by establishing a universal natural language processing customized training and development platform based on a pre-training semantic understanding technology and using the model training method, and therefore, demands of industrial application can be met.

Specifically, by means of the technical solutions of the implementations of the present disclosure, the model training platform is provided. The model training platform can cover the overall natural language processing customized development scenario, more efficient model training capacity can be provided through the customized pre-training technology, the simple and easy interaction mode can be provided, expandability of the platform can be improved through independence between the modules, and therefore, user experience can be improved by providing capacity of efficient model training, especially model training of deep learning.

Furthermore, by using the model training platform and the model training method according to the implementations of the present disclosure, a typical natural language processing customized development scenario as comprehensive as possible can be covered, a rich industry-level application support system is formed, most of these prefabricated tasks can be set directly through a json configuration file, which can be fast to master and run; research and development of the customized pre-training technology can be performed aiming at specific scenarios such as healthcare, laws and regulations, affective computing, text check and the financial field, thus an excellent effect can be achieved in the case of application in the specific scenarios without performing of expensive model pre-training, and a rich pre-training model system is finally formed; new functions can be flexibly expanded through mutual independence of all the modules so as to adapt to complex development tasks; and besides, a simple and easy-to-master web interactive development mode can be provided so that users with different technical backgrounds and even having no deep learning development experience can perform customized development.

According to an embodiment of the present disclosure, the present disclosure further provides an electronic device and a computer readable storage medium.

Figure 6:
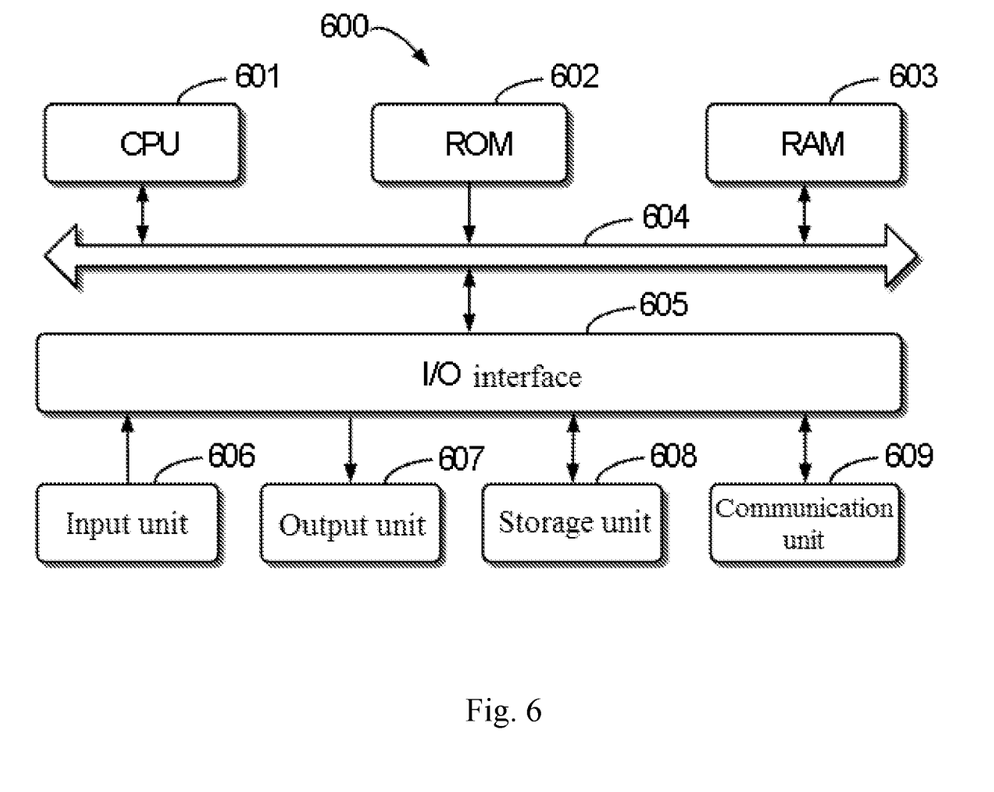
FIG. 6 shows a schematic block diagram of an exemplary electronic device 600 which can be used for implementing embodiments of the present disclosure.

FIG. 6 shows a schematic block diagram of an exemplary electronic device 600 which can be used for implementing embodiments of the present disclosure. For example, the model training platform 100 shown in FIG. 1, the model training platform 200 shown in FIG. 2 and the computing device 310 shown in FIG. 3 can be implemented by the electronic device 600. The electronic device 600 intends to represent various digital computers such as a laptop, a desktop computer, a workbench, a personal digital assistant, a server, a blade server, a mainframe computer and other suitable computers. The electronic device may further represent various mobile apparatuses such as the personal digital assistant, a cellular phone, a smart phone, a wearable device and other similar computing apparatuses. Components as well as their connections, relations and functions shown herein only serve as examples and are not intended to limit the implementation of the present disclosure described and/or required herein.

As shown in FIG. 6, the device 600 includes a computing unit 601 which can execute various appropriate actions and processing according to a computer program stored in a read-only memory (ROM) 602 or a computer program loaded into a random access memory (RAM) 603 from a storage unit 608. Various programs and data needed by operation of the device 600 may also be stored in the RAM 603. The computing unit 601, the ROM 602 and the RAM 603 are mutually connected through a bus 604. An input/output (I/O) interface 605 is also connected to the bus 604.

Many components in the device 600 are connected to the I/O interface 605, including: an input unit 606, such as a keyboard, a mouse, etc.; an output unit 607, such as various displays, loudspeakers, etc.; the storage unit 608, such as a magnetic disc, a compact disc, etc.; and a communication unit 609, such as a network card, a modulator-demodulator, a wireless communication transceiver, etc. The communication unit 609 allows the device 600 to exchange information/data with other devices through a computer network (such as the Internet) and/or various telecommunication networks.

The computing unit 601 may be various general and/or special processing components with processing and computing capacity. Some examples of the computing unit 601 include but are not limited to a central processing unit (CPU), a graphics processing unit (GPU), various special artificial intelligence (AI) computing chips, various computing units for running a machine learning model algorithm, a digital signal processor (DSP) and any appropriate processor, controller, microcontroller, etc. The computing unit 601 executes all the methods (such as the method 400 and the method 500) and processing described above. For example, in some embodiments, the method 400 and the method 500 may be realized as a computer software program, which is tangibly contained in a machine readable medium, for example, the storage unit 608. In some embodiments, part of or all of the computer program can be loaded into and/or installed onto the device 600 through the ROM 602 and/or the communication unit 609. When the computer program is loaded into the RAM 603 and executed by the computing unit 601, one or more steps of the method 400 and the method 500 described above can be executed. Alternatively, in other embodiments, the computing unit 601 may be configured to execute the method 400 and the method 500 in any other suitable mode (such as by virtue of firmware).

Various implementations of the system and the technology described above herein may be realized in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software and/or their combinations. These various implementations may include: implementation in one or more computer programs, wherein the one or more computer programs can be executed and/or explained on a programmable system including at least one programmable processor, and the programmable processor may be a special or universal programmable processor and can receive data and instructions from a storage system, at least one input apparatus and at least one output apparatus and transmit the data and the instructions to the storage system, the at least one input apparatus and the at least one output apparatus.

Program codes for implementing the method of the present disclosure may be written by adopting one programming language or any combination of more programming languages. These program codes may be provided to a general-purpose computer, a special-purpose computer or processors or controllers of other programmable data processing apparatuses, so that the functions/operations regulated in the flowcharts and/or the block diagrams can be implemented when the program codes are executed by the processors or the controllers. The program codes may be entirely executed on a machine, partially executed on the machine, partially executed on the machine as a stand-alone software package and partially executed on a remote machine, or entirely executed on the remote machine or a server.

In the context of the present disclosure, the machine readable medium may be a tangible medium which may contain or store programs used by an instruction executing system, apparatus or device, or used in combination with the instruction executing system, apparatus or device. The machine readable medium may be a machine readable signal medium or a machine readable storage medium. The machine readable medium may include but is not limited to an electronic, magnetic, optical, electromagnetic, infrared or semiconductor system, apparatus or device, or any suitable combination of the above contents. More particular examples of the machine readable storage medium may include electrical connection based on one or more wires, a potable computer disk, a hard disk, a random access memory (RAM), a read-only memory (ROM), an erasable programmable read-only memory (EPROM or a flash memory), optical fibers, a portable compact disc read-only memory (CD-ROM), an optical storage device, a magnetic storage device or any suitable combination of the above contents.

In order to provide the interaction with the user, the system and the technology described herein may be implemented on a computer. The computer has: a display apparatus used for displaying information to the user (for example, a cathode ray tube (CRT) or a liquid crystal display (LCD) monitor); and a keyboard and a pointing apparatus (for example, a mouse or a trackball). The user can provide the input to the computer through the keyboard and the pointing apparatus. Other types of apparatuses may be further used for providing the interaction with the user, for example, a feedback provided to the user may be any form of sensing feedbacks (for example, a visual feedback, an auditory feedback, or a tactile feedback), and the input from the user can be received in any form (including a sound input, a voice input or a tactile input).

The system and the technology described herein may be implemented in a computing system including back-end components (for example, serving as a data server), or a computing system including middleware components (for example, an application server), or a computing system including front end components (for example, a user computer with a graphical user interface or a web browser, wherein the user can interact with the implementations of the system and the technology described herein through the graphical user interface or the web browser), or a computing system including any combination of the back-end components, the middleware components or the front end components. The components of the system can be mutually connected through digital data communication (for example, a communication network) in any form or medium. Examples of the communication network include: a local area network (LAN), a wide area network (WAN) and the Internet.

The computer system may include a client and a server. The client and the server are generally far from each other and usually interact through the communication network. A relation between the client and the server is generated through a computer program running on the corresponding computer and having a client-server relation.

It should be understood that the processes of various forms shown above may be used for reordering, adding or deleting steps. For example, all the steps recorded in the present disclosure may be executed in parallel or in sequence or in different sequences as long as a designed result of the technical solutions disclosed by the present disclosure can be realized, which is not limited herein.

The above specific implementations do not constitute limit to the protection scope of the present disclosure. Those skilled in the art should understand that various modifications, combinations, sub-combinations and replacements may be made according to design requirements and other factors. Any modification, equivalent replacement, improvement, etc. made within the spirit and the principle of the present disclosure should fall within the protection scope of the present disclosure.

What is claimed is:

1. A model training method for natural language processing, the method comprising:
   receiving, by a computing device, an input through an interaction on an interactive interface performed using at least one interaction mode, wherein the at least one interaction mode is associated with the interactive interface;
   determining, by the computing device, based on the input, a user-oriented prefabricated function, wherein the user-oriented prefabricated function is a text processing function associated with a model to be trained;
   determining, by the computing device, based on the input, a model training function associated with a training process of the model, wherein the model training function includes one or more of the following functions: an actuator initializing function, an operational program initializing function, a single-machine-multi-card environment configuration function, a multi-machine-multi-card environment configuration function, a multi-machine central processing unit environment configuration function, a model loading function, or a model saving function;
   determining, by the computing device, based on the input, a pre-trained model that is pre-trained based on deep learning;
   determining, by the computing device, based on the input, a network structure associated with the pre-trained model;
   providing, by the computing device, an initial network structure, wherein the initial network structure is a common structure integrated by a plurality of different reference pre-trained models;
   configuring, by the computing device, the initial network structure as the network structure associated with the pre-trained model so as to support use of the pre-trained model;
   training, by the computing device, based on the input, the model using the user-oriented prefabricated function, the model training function, and the pre-trained model;
   providing, by the computing device, through the interaction performed using the at least one interaction mode, an output associated with the trained model; and
   using, by the computing device, a function associated with applying the trained model so as to apply the trained model, wherein the function associated with applying the trained model includes providing one or more functions as follows: a special processing unit deployment function, a central processing unit deployment function, a single prediction function, a batch prediction function, a C++application programming interface function, or a Python application programming interface function.

2. The method according to claim 1, wherein the interaction comprises one or more interactions as follows:
   an interaction associated with a network selection;
   an interaction associated with network assembly;
   an interaction associated with network storage;
   an interaction associated with training package assembly;
   an interaction associated with training task initiation;
   an interaction associated with authentication; or
   an interaction associated with statistics.

3. The method according to claim 1, further comprising:
   receiving configuration information, wherein the configuration information is associated with requesting to apply a function associated with model training.

4. The method according to claim 3, wherein the receiving the configuration information comprises one or more of the following:
   importing the configuration information;
   registering the configuration information;
   performing, based on the configuration information, json parsing; or
   performing, based on the configuration information, class name matching.

5. The method according to claim 1, further comprising:
   performing preprocessing on the input.

6. The method according to claim 5, wherein the performing preprocessing on the input comprises one or more of the following:
   reading a data set from the input for preprocessing;
   reading a domain from the input for preprocessing;
   performing tokenization on the input for preprocessing; or
   obtaining a vocabulary from the input for preprocessing.

7. The method according to claim 1, further comprising:
   using support for design and development of a network structure of a complex learning task.

8. The method according to claim 7, wherein the using the support for design and development of the network structure of the complex learning task comprises one or more of the following:
  using a forward propagation network used for the complex learning task;
  using an optimization strategy used for design and development of the network structure; or
  using an evaluation index used for design and development of the network structure.

9. The method according to claim 1, further comprising:
  adjusting, based on the input, an operation associated with the model training.

10. The method according to claim 9, wherein the adjusting, based on the input, the operation associated with the model training comprises one or more of the following:
  adjusting, based on the input, the training process associated with the model training;
  adjusting, based on the input, an evaluation process associated with the model training; or
  adjusting, based on the input, visual evaluation associated with the model training.

11. The method according to claim 1, further comprising:
  using a function associated with applying the trained model so as to apply the trained model.

12. The method according to claim 11, wherein the using the function associated with applying the trained model comprises using one or more of the following:
  a special processing unit deployment function,
  a central processing unit deployment function,
  a single prediction function, a batch prediction function,
  a C++ application programming interface function, or
  a Python application programming interface function.

13. An electronic device for natural language processing, the electronic device comprising:
  at least one processor; and
  a memory in communication connection with the at least one processor, wherein the memory stores instructions executable by the at least one processor, and the instructions are executed by the at least one processor to cause the at least one processor to execute:
    receiving an input through an interaction on an interactive interface performed using at least one interaction mode, wherein the at least one interaction mode is associated with the interactive interface;
    determining, based on the input, a user-oriented prefabricated function, wherein the user-oriented prefabricated function is a text processing function associated with a model to be trained;
    determining, based on the input, a model training function associated with a training process of the model, wherein the model training function includes one or more of the following functions: an actuator initializing function, an operational program initializing function, a single-machine-multi-card environment configuration function, a multi-machine-multi-card environment configuration function, a multi-machine central processing unit environment configuration function, a model loading function, or a model saving function;
    determining, based on the input, a pre-trained model that is pre-trained based on deep learning;
    determining, based on the input, a network structure associated with the pre-trained model;
    providing an initial network structure, wherein the initial network structure is a common structure integrated by a plurality of different reference pre-trained models;
    configuring the initial network structure as the network structure associated with the pre-trained model so as to support use of the pre-trained model;
    training, based on the input, the model using the user-oriented prefabricated function, the model training function, and the pre-trained model;
    providing, through the interaction performed using the at least one interaction mode, an output associated with the trained model; and
    using a function associated with applying the trained model so as to apply the trained model, wherein the function associated with applying the trained model includes providing one or more functions as follows: a special processing unit deployment function, a central processing unit deployment function, a single prediction function, a batch prediction function, a C++ application programming interface function, or a Python application programming interface function.

14. The electronic device according to claim 13, wherein the interaction comprises one or more interactions as follows:
  an interaction associated with a network selection;
  an interaction associated with network assembly;
  an interaction associated with network storage;
  an interaction associated with training package assembly;
  an interaction associated with training task initiation;
  an interaction associated with authentication; or
  an interaction associated with statistics.

15. The electronic device according to claim 13, wherein the instructions further cause the at least one processor to execute:
  receiving configuration information, wherein the configuration information is associated with requesting to apply a function associated with model training.

16. The electronic device according to claim 13, wherein the receiving the configuration information comprises one or more of the following:
  importing the configuration information;
  registering the configuration information;
  performing, based on the configuration information, json parsing; or
  performing, based on the configuration information, class name matching.

17. A non-transitory computer readable storage medium for natural language processing storing computer instructions that, when executed by one or more processors, are configured to cause a computer to execute:
  receiving an input through an interaction on an interactive interface performed using at least one interaction mode, wherein the at least one interaction mode is associated with the interactive interface;
  determining, based on the input, a user-oriented prefabricated function, wherein the user-oriented prefabricated function is a text processing function associated with a model to be trained;
  determining, based on the input, a model training function associated with a training process of the model, wherein the model training function includes one or more of the following functions: an actuator initializing function, an operational program initializing function, a single-machine-multi-card environment configuration function, a multi-machine-multi-card environment configuration function, a multi-machine central processing unit environment configuration function, a model loading function, or a model saving function;
determining, based on the input, a pre-trained model that is pre-trained based on deep learning;
determining, based on the input, a network structure associated with the pre-trained model;
providing an initial network structure, wherein the initial network structure is a common structure integrated by a plurality of different reference pre-trained models:
configuring the initial network structure as the network structure associated with the pre-trained model so as to support use of the pre-trained model;
training, based on the input, the model using the user-oriented prefabricated function, the model training function, and the pre-trained model;
providing, through the interaction performed using the at least one interaction mode, an output associated with the trained model; and
using a function associated with applying the trained model so as to apply the trained model, wherein the function associated with applying the trained model includes providing one or more functions as follows: a special processing unit deployment function, a central processing unit deployment function, a single prediction function, a batch prediction function. a C++ application programming interface function, or a Python application programming interface function.

18. The non-transitory computer readable storage medium according to claim 17, wherein the interaction comprises one or more interactions as follows:
an interaction associated with a network selection;
an interaction associated with network assembly;
an interaction associated with network storage;
an interaction associated with training package assembly;
an interaction associated with training task initiation;
an interaction associated with authentication; or
an interaction associated with statistics.

19. The non-transitory computer readable storage medium according to claim 17, wherein the computer instructions further cause the computer to execute:
receiving configuration information, wherein the configuration information is associated with requesting to apply a function associated with model training.

20. The non-transitory computer readable storage medium according to claim 19, wherein the receiving the configuration information comprises one or more of the following:
importing the configuration information;
registering the configuration information;
performing, based on the configuration information, json parsing; or
performing, based on the configuration information, class name matching.

\* \* \* \* \*